US009430030B2

(12) United States Patent
Hsu et al.

(10) Patent No.: US 9,430,030 B2
(45) Date of Patent: Aug. 30, 2016

(54) STATUS SWITCHING METHOD

(71) Applicant: Silicon Motion, Inc., Jhubei, Hsinchu County (TW)

(72) Inventors: Yao-Chung Hsu, Taipei (TW); Tuan-Chieh Wang, Wandan Township, Pingtung County (TW); Chi-Chih Kuan, Nantou (TW); Chun-Yu Chen, New Taipei (TW)

(73) Assignee: SILICON MOTION, INC., Jhubei, Hsinchu County (JP)

( * ) Notice: Subject to any disclaimer, the term of this patent is extended or adjusted under 35 U.S.C. 154(b) by 336 days.

(21) Appl. No.: 14/202,234

(22) Filed: Mar. 10, 2014

(65) Prior Publication Data

US 2014/0297912 A1   Oct. 2, 2014

(30) Foreign Application Priority Data

Mar. 29, 2013  (TW) .............................. 102111369 A

(51) Int. Cl.
  *G06F 3/06* (2006.01)
  *G06F 1/32* (2006.01)
  *G06F 13/38* (2006.01)
(52) U.S. Cl.
  CPC .................................... *G06F 1/325* (2013.01)
(58) Field of Classification Search
  None
  See application file for complete search history.

(56) References Cited

U.S. PATENT DOCUMENTS

| 7,702,820 | B2 | 4/2010 | Tu et al. | |
| 7,996,586 | B2 | 8/2011 | Liu | |
| 8,596,529 | B1 * | 12/2013 | Kolls | G06Q 30/06 235/380 |
| 2010/0275037 | A1 | 10/2010 | Lee et al. | |
| 2011/0113162 | A1 * | 5/2011 | Miyasaka | G06F 13/4022 710/11 |
| 2014/0344617 | A1 * | 11/2014 | Resch | G06F 11/1088 714/6.31 |

FOREIGN PATENT DOCUMENTS

| CN | 101136001 | 3/2008 |
| CN | 101876958 | 11/2010 |
| TW | 200823671 A | 6/2008 |
| TW | 201308092 A1 | 2/2013 |

OTHER PUBLICATIONS

Full English (machine) translation for TW200823671 (Published Jun. 1, 2008).
Full English (machine) translation for TW201308092 (Published Feb. 16, 2013).
Hewlett-Packard Company, et al; "Universal Serial Bus 3.0 Specification;" Nov. 2008; pp. 1-6.

* cited by examiner

*Primary Examiner* — Scott Sun
(74) *Attorney, Agent, or Firm* — McClure, Qualey & Rodack, LLP

(57) ABSTRACT

The present invention provides a status switching method applied to a slave device. The status switching method includes: receiving a command wrapper from a host device; receiving a status query command corresponding to the command wrapper from the host device; transmitting a status wrapper to the host device in response to the status query command; and refusing to enter a low-power status corresponding to a switch status request when the switch status request is received during a specific period, wherein the specific period starts when the command wrapper is received and ends when the status wrapper is transmitted.

10 Claims, 5 Drawing Sheets

STATUS SWITCHING METHOD

CROSS REFERENCE TO RELATED APPLICATIONS

This Application claims priority of Taiwan Patent Application No. 102111369, filed on Mar. 29, 2013, the entirety of which is incorporated by reference herein.

BACKGROUND OF THE INVENTION

1. Field of the Invention

The present invention relates to a switching method applied to a slave device, and in particular to a switching method capable of determining switching status in response to the command from a host device.

2. Description of the Related Art

As technology advances, electronic products are also increasingly popular. Specifically, portable electronic products, such as Smartphones, Notebooks, Personal Digital Assistants (PDA) and external electronic devices, etc., are popular because of their multiple functions and compact size. The power consumption is important for portable electronic products, and it is important to extend the usage time without changing the functionality of the portable electronic products to make it more convenient and friendly to use.

Generally, the electronic devices are arranged to enter a standby mode, a hibernation mode or a low-power state in response to the operation of the operating system and interface to reduce the power consumption. However, the electronic devices may be forced to enter the standby mode, the hibernation mode or the low-power state in some improper situations, which can lead to data loss and a reduction of efficiency.

BRIEF SUMMARY OF THE INVENTION

A detailed description is given in the following embodiments with reference to the accompanying drawings.

The present invention provides a status switching method applied to a slave device. The status switching method comprises: receiving a command wrapper from a host device; receiving a status query command corresponding to the command wrapper from the host device; transmitting a status wrapper to the host device in response to the status query command; and refusing to enter a low-power status corresponding to a switch status request when the switch status request is received during a specific period, wherein the specific period starts when the command wrapper is received and ends when the status wrapper is transmitted.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
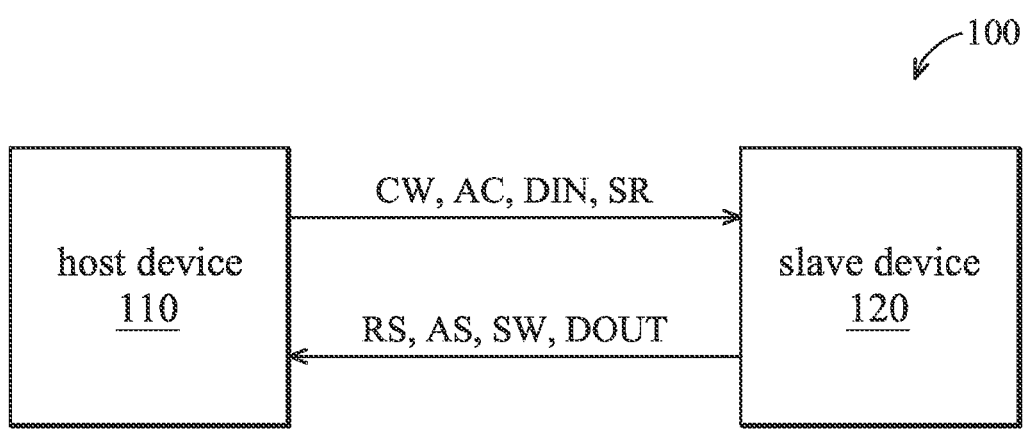
FIG. 1 is a schematic diagram illustrating an embodiment of an electronic system of the present invention.

FIG. 1 is a schematic diagram illustrating an embodiment of an electronic system of the present invention. The electronic system 100 includes a host device 110 and a slave device 120. The electronic system 100 can be applied to a computer configuration, such as hand-held devices, multi-processor systems, microprocessor-based or programmable consumer electronic products, mini computers, tablet PCs or the like, but it is not limited thereto. In one of the embodiments, the slave device 120 and the host device 110 are implemented in one electronic device, but it is not limited thereto. In other embodiments, the slave device 120 and the host device 110 may be implemented in two different electronic devices.

The host device 110 and the slave device 120 are coupled by a communication interface. The host device 110 is arranged to transmit the command wrapper CW, the status query command AC, the data DIN and the switch status request SR to the slave device 120 through the communication interface. Moreover, the host device 110 is further arranged to receive the reject signal RS, the accept signal AS, the status wrapper SW and the data DOUT from the slave device 120 through the communication interface. Namely, the slave device 120 is arranged to transmit the reject signal RS, the accept signal AS, the status wrapper SW and the data DOUT to the host device 110 through the communication interface. Moreover, the slave device 120 is further arranged to receive the command wrapper CW, the status query command AC, the switch status request SR and the data DIN from the host device 110 through the communication interface.

It should be noted that, in one of the embodiments, the communication interface can be Universal Serial Bus 3.0 interface (USB 3.0), but it is not limited thereto. Namely, the host device 110 has an interface complying with the Universal Serial Bus 3.0 specification, and the host device 110 is coupled to the slave device 120 through the interface complying with the Universal Serial Bus 3.0 specification, wherein the slave device 120 also complies with the Universal Serial Bus 3.0 specification.

For example, when the host device 110 needs to read the data of the slave device 120, the host device 110 transmits a command wrapper CW corresponding to data-reading to the slave device 120. When the slave device 120 receives the command wrapper CW corresponding to data-reading, the slave device 120 transmits the data DOUT to the host device 110 in response to the command wrapper CW. When the host device 110 determines that all of the data DOUT is transmitted, the host device 110 transmits a status query command AC corresponding to the command wrapper CW to the slave device 120, wherein the command wrapper CW includes a data length of the data which is going to be read, and the host device 110 is arranged to determine whether all of the data DOUT is transmitted (read) according to the data length of the command wrapper CW. When the slave device 120 receives the status query command AC corresponding to the command wrapper CW, the slave device 120 transmits a status wrapper SW to the host device 110 after the data DOUT is all transmitted, wherein the status wrapper SW is arranged to indicate that all of the data DOUT is transmitted.

When the host device 110 needs to transmit data to the slave device 120, the host device 110 is arranged to transmit a command wrapper CW corresponding to data-transmitting to the slave device 120. When the slave device 120 receives the command wrapper CW corresponding to data-transmitting, the slave device 120 receives the data DIN from the host device 110 in response to the command wrapper CW. When the host device 110 determines that all of the data DIN is transmitted, the host device 110 transmits a status query command AC corresponding to the command wrapper CW to the slave device 120, wherein the command wrapper CW includes a data length of the data which is arranged to be transmitted, and the host device 110 is arranged to determine whether the data DIN is all transmitted according to the data length of the command wrapper CW. When the slave device 120 receives the status query command AC corresponding to the command wrapper CW, the slave device 120 is arranged to transmit a status wrapper SW to the host device 110 after all of the data DIN is transmitted, wherein the status wrapper SW is arranged to indicate that all of the data DIN is transmitted.

It should be noted that when the communication interface is the USB 3.0 interface, the command wrapper CW is the Command Block Wrapper (CBW) of the Universal Serial Bus 3.0 specification, and the status wrapper SW is the Command Status Wrapper (CSW) of the Universal Serial Bus 3.0 specification, wherein the host device 110 is arranged to pack the command wrapper CW and the data DIN into at least one Data Packet (DP) of the Universal Serial Bus 3.0 specification to transmit to the slave device 120, and the slave device 120 is arranged to pack the status wrapper SW and the data DOUT into at least one Data Packet (DP) of the Universal Serial Bus 3.0 specification to transmit to the host device 110. Moreover, the host device 110 is arranged to pack the status query command AC in to at least one Transaction Packet (TP) of the Universal Serial Bus 3.0 specification to transmit to the slave device 120.

If the host device 110 wants to require the slave device 120 to enter a low-power status, the host device 110 may transmit a switch status request SR to the slave device 120 to enable the slave device 120 to enter the low-power status. It should be noted that, when the slave device 120 receives the switch status request SR from the host device 110 during a specific period, the slave device 120 refuses to enter the low-power status in response to the switch status request SR and transmits a reject signal RS to the host device 110, wherein the specific period starts when the command wrapper CW is received by the slave device 120 and ends when the status wrapper SW is transmitted by the slave device 120. When the slave device 120 receives the switch status request SR of the host device 110 outside of the specific period, the slave device 120 enters the low-power status in response to the switch status request SR and transmits an accept signal AS to the host device 110.

It should be noted that, when the communication interface is USB 3.0 interface, the low-power status is the Fast Exit Idle U1 or the Slow Exit Idle U2 of the Universal Serial Bus 3.0 specification. If the host device 110 wants to require the slave device 120 to enter the Fast Exit Idle U1 or the Slow Exit Idle U2, the host device 110 needs to transmit a Link command LGO_U1 or a Link command LGO_U2 to the slave device 120. Namely, in this embodiment, the switch status request SR is the Link command LGO_U1 or the Link command LGO_U2. However, the slave device 120 is arranged to transmit the data DOUT or the data DIN when the slave device 120 receives the switch status request SR from the host device 110 during the specific period. In one of the embodiments, when the slave device 120 receives the Link command LGO_U1 or the Link command LGO_U2 during the specific period, the slave device 120 refuses to enter the Fast Exit Idle U1 corresponding to the Link command LGO_U1 or the low Exit Idle U2 corresponding to the Link command LGO_U2 and transmits a reject signal RS to the host device 110. Moreover, when the slave device 120 receives the Link command LGO_U1 or the Link command LGO_U2 outside of the specific period, the slave device 120 enters the Fast Exit Idle U1 corresponding to the Link command LGO_U1 or the low Exit Idle U2 corresponding to the Link command LGO_U2, and transmits the accept signal AS to the host device 110. In this embodiment, the reject signal RS is the LXU defined by the USB 3.0 specification, and the accept signal AS is the LAU defined by the USB 3.0 specification, but it is not limited thereto.

Figure 2:
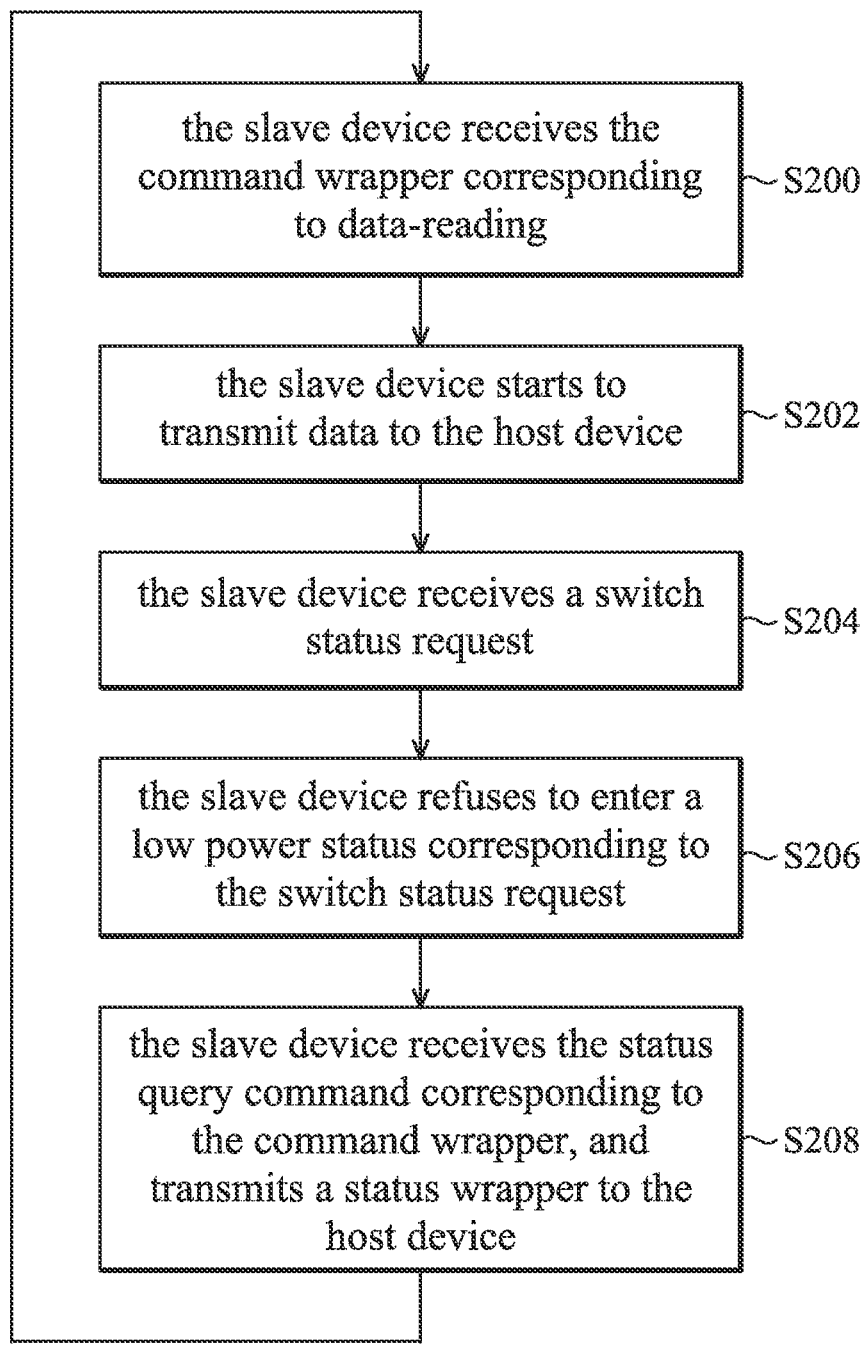
FIG. 2 is a flowchart of a status switching method according to an embodiment of the present invention.

FIG. 2 is a flowchart of a status switching method according to an embodiment of the present invention. The status switching method is applied to the slave device 120. The process starts at step S200.

In step S200, the slave device 120 receives the command wrapper CW corresponding to data-reading. It should be noted that, when the communication interface is the USB 3.0 interface, the command wrapper CW is the Command Block Wrapper (CBW) of the Universal Serial Bus 3.0 specification, wherein the host device 110 is arranged to pack the command wrapper CW and the data DIN into at least one Data Packet (DP) of the Universal Serial Bus 3.0 specification to transmit to the slave device 120.

Next, in step S202, the slave device 120 starts to transmit the data DOUT to the host device 110 in response to the command wrapper CW.

Next, in step S204, the slave device 120 receives a switch status request SR. Namely, the slave device 120 receives the switch status request SR from the host device 110 during the specific period, wherein the specific period starts when the command wrapper CW is received by the slave device 120 and ends when the status wrapper SW is transmitted by the slave device 120.

Next, in step S206, the slave device 120 refuses to enter a low-power status corresponding to the switch status request SR and transmits a reject signal RS to the host device 110. It should be noted that, when the communication interface is the USB 3.0 interface, the low-power status is the Fast Exit Idle U1 or the Slow Exit Idle U2 of the Universal Serial Bus 3.0 specification. In this embodiment, the switch status request SR is the Link command LGO_U1 or the Link command LGO_U2. Moreover, the reject signal RS is the LXU defined by the USB 3.0 specification, but it is not limited thereto.

Next, in step S208, the slave device 120 receives the status query command AC corresponding to the command wrapper CW, and transmits a status wrapper SW to the host device 110 after finishing transmitting the data DOUT in response to the status query command AC, wherein the status wrapper SW is arranged to indicate that all of the data DOUT is transmitted. It should be noted that when the communication interface is the USB 3.0 interface, the status wrapper SW is the Command Status Wrapper (CSW) of the Universal Serial Bus 3.0 specification, wherein the slave device 120 is arranged to pack the status wrapper SW and the data DOUT onto at least one Data Packet (DP) of the Universal Serial Bus 3.0 specification to transmit to the host device 110. Moreover, the host device 110 is arranged to pack the status query command AC in to at least one Transaction Packet (TP) of the Universal Serial Bus 3.0 specification to transmit to the slave device 120. Next, the process returns to the step S200.

Figure 3:
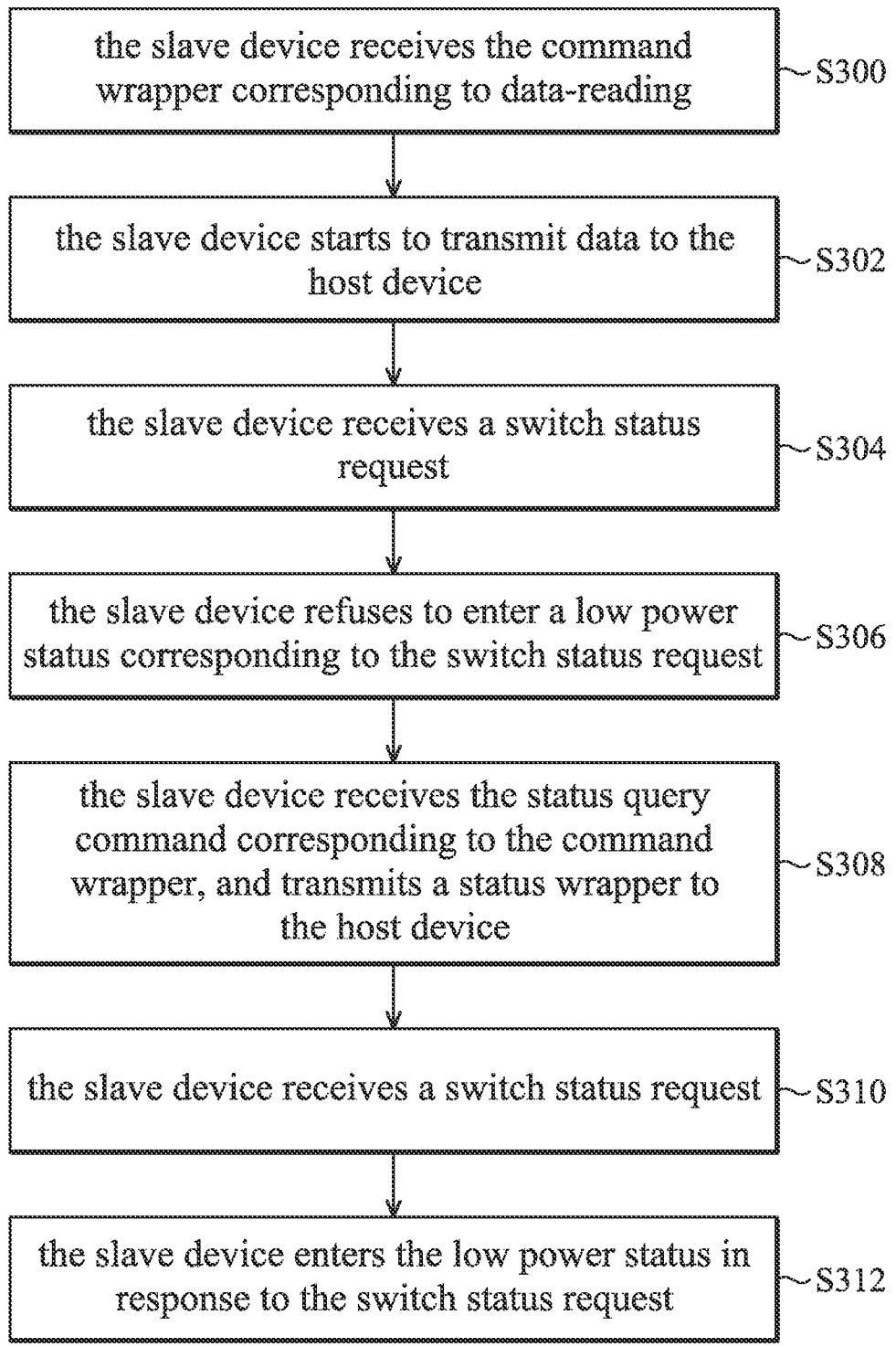
FIG. 3 is a flowchart of a status switching method according to another embodiment of the present invention.

FIG. 3 is a flowchart of a status switching method according to another embodiment of the present invention. The status switching method is applied to the slave device 120. Steps S300-S308 of FIG. 3 are similar to steps S200-S208 of FIG. 2, and the details of the steps S300-S308 can be referred to FIG. 2.

In step S310, the slave device 120 receives a switch status request SR. Namely, the slave device 120 receives the switch status request SR of the host device 110 outside of the specific period.

Next, in step S312, the slave device 120 enters the low-power status in response to the switch status request SR and transmits an accept signal AS to the host device 110. It should be noted that, when the communication interface is USB 3.0 interface, the low-power status is the Fast Exit Idle U1 or the Slow Exit Idle U2 of the Universal Serial Bus 3.0 specification. In this embodiment, the switch status request SR is the Link command LGO_U1 or the Link command LGO_U2. Moreover, the accept signal AS is the LAU defined by the USB 3.0 specification, but it is not limited thereto. The process ends at step S312.

Figure 4:
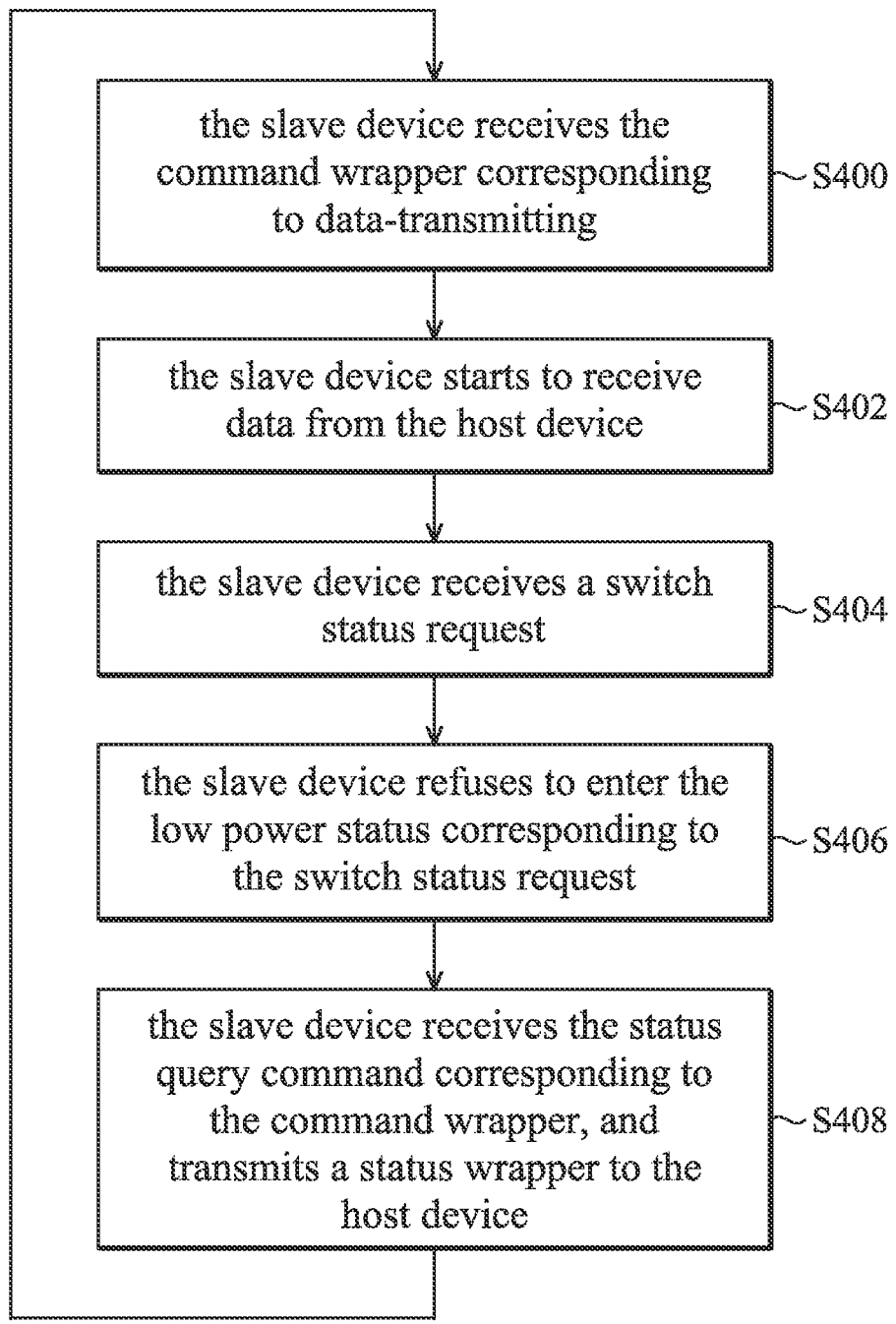
FIG. 4 is a flowchart of a status switching method according to another embodiment of the present invention.

FIG. 4 is a flowchart of a status switching method according to another embodiment of the present invention. The status switching method is applied to the slave device 120. The process starts at step S400.

In step S400, the slave device 120 receives the command wrapper CW corresponding to data-transmitting. It should be noted that when the communication interface is the USB 3.0 interface, the command wrapper CW is the Command Block Wrapper (CBW) of the Universal Serial Bus 3.0 specification, wherein the host device 110 is arranged to pack the command wrapper CW and the data DIN into at least one Data Packet (DP) of the Universal Serial Bus 3.0 specification to transmit to the slave device 120.

Next, in step S402, the slave device 120 starts to receive the data DIN from the host device 110 in response to the command wrapper CW corresponding to data-transmitting.

Next, in step S404, the slave device 120 receives a switch status request SR. Namely, the slave device 120 receives the switch status request SR during the specific period.

Next, in step S406, the slave device 120 refuses to enter the low-power status corresponding to the switch status request SR and transmits a reject signal RS to the host device 110. It should be noted that, when the communication interface is the USB 3.0 interface, the low-power status is the Fast Exit Idle U1 or the Slow Exit Idle U2 of the Universal Serial Bus 3.0 specification. In this embodiment, the switch status request SR is the Link command LGO_U1 or the Link command LGO_U2. Moreover, the reject signal RS is the LXU defined by the USB 3.0 specification, but it is not limited thereto.

Next, in step S408, the slave device 120 receives the status query command AC corresponding to the command wrapper CW, and transmits a status wrapper SW to the host device 110 after finishing transmitting the data DIN in response to the status query command AC, status query command AC, wherein the status wrapper SW is arranged to indicate that all of the data DIN is transmitted. It should be noted that, when the communication interface is the USB 3.0 interface, the status wrapper SW is the Command Status Wrapper (CSW) of the Universal Serial Bus 3.0 specification, wherein the slave device 120 is arranged to pack the status wrapper SW and the data DOUT into at least one Data Packet (DP) of the Universal Serial Bus 3.0 specification to transmit to the host device 110. Moreover, the host device 110 is arranged to pack the status query command AC into the Transaction Packet (TP) of the Universal Serial Bus 3.0 specification to transmit to the slave device 120. Next, the process returns to step S400.

Figure 5:
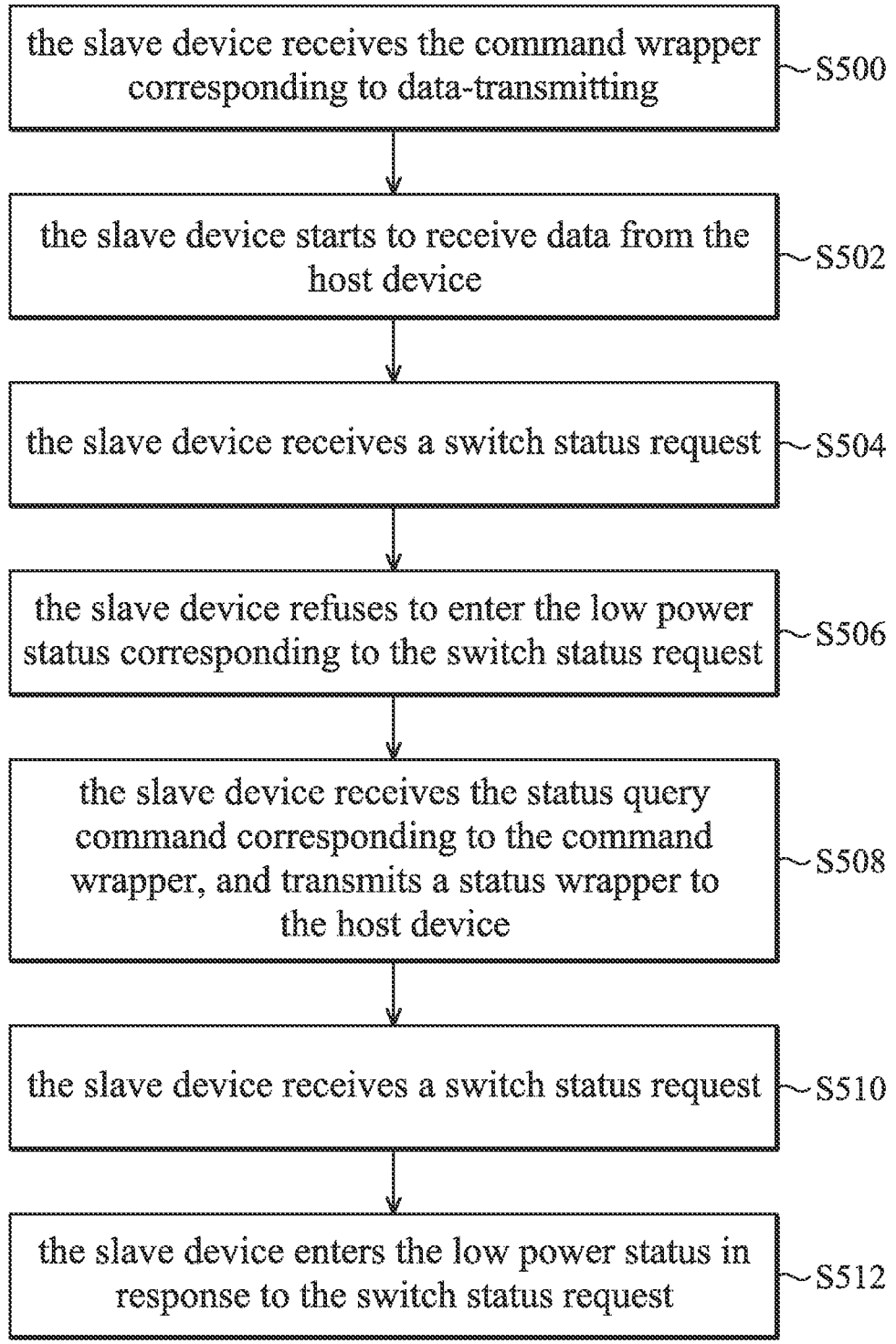
FIG. 5 is a flowchart of a status switching method according to another embodiment of the present invention.

FIG. 5 is a flowchart of a status switching method according to another embodiment of the present invention. The status switching method is applied to the slave device 120. Steps S500-S508 of FIG. 5 are similar to steps S400-S408 of FIG. 4. Therefore, the details of steps S500-S508 can be referred to in FIG. 4.

In step S510, the slave device 120 receives a switch status request SR. Namely, the slave device 120 receives a switch status request SR from the host device 110 during the specific period.

Next, in step S512, the slave device 120 enters the low-power status in response to the switch status request SR, and transmits an accept signal AS to the host device 110. It should be noted that, when the communication interface is the USB 3.0 interface, the low-power status is the Fast Exit Idle U1 or the Slow Exit Idle U2 of the Universal Serial Bus 3.0 specification. In this embodiment, the switch status request SR is the Link command LGO_U1 or the Link command LGO_U2. Moreover, the accept signal AS is the LAU defined by the USB 3.0 specification, but it is not limited thereto. The process ends at step S512.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A status switching method, applied to a slave device, wherein the status switching method comprises:
   receiving a command wrapper from a host device;
   receiving a status query command corresponding to the command wrapper form the host device;
   transmitting a status wrapper to the host device in response to the status query command; and
   refusing to enter a low-power status corresponding to a switch status request when the switch status request is received during a specific period, wherein the specific period starts when the command wrapper is received and ends when the status wrapper is transmitted.

2. The status switching method as claimed in claim 1, wherein the slave device complies with the Universal Serial Bus 3.0 specification.

3. The status switching method as claimed in claim 2, wherein the command wrapper is a Command Block Wrapper of the Universal Serial Bus 3.0 specification.

4. The status switching method as claimed in claim 2, wherein the status wrapper is a Command Status Wrapper of the Universal Serial Bus 3.0 specification.

5. The status switching method as claimed in claim 1, wherein the low-power status is "Fast Exit Idle" status of the Universal Serial Bus 3.0 specification.

6. The status switching method as claimed in claim 1, wherein the low-power status is "Slow Exit Idle" status of the Universal Serial Bus 3.0 specification.

7. The status switching method as claimed in claim 1, further comprising receiving data from the host device or transmitting data to the host device in response to the command wrapper.

8. The status switching method as claimed in claim 1, wherein the step of refusing to enter the low-power status corresponding to the switch status request further comprises transmitting a reject signal to the host device.

9. The status switching method as claimed in claim 1, further comprising entering the low-power status corresponding to the switch status request when the switch status request of the host device is received outside of the specific period.

10. The status switching method as claimed in claim 9, wherein the step of entering the low-power status corresponding to the switch status request further comprises transmitting an accept signal to the host device.

* * * * *